US008429637B2

(12) United States Patent
Myles et al.

(10) Patent No.: US 8,429,637 B2
(45) Date of Patent: Apr. 23, 2013

(54) SYSTEM AND METHOD FOR CONDITIONAL EXPANSION OBFUSCATION

(75) Inventors: Gideon M. Myles, San Jose, CA (US); Tanya Michelle Lattner, San Jose, CA (US); Julien Lerouge, Santa Clara, CA (US); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1131 days.

(21) Appl. No.: 12/202,909

(22) Filed: Sep. 2, 2008

(65) Prior Publication Data
US 2010/0058303 A1  Mar. 4, 2010

(51) Int. Cl.
*G06F 9/45* (2006.01)

(52) U.S. Cl.
USPC ........... 717/159; 717/141; 712/208; 713/194; 726/26

(58) Field of Classification Search .................... 717/159
See application file for complete search history.

(56) References Cited

U.S. PATENT DOCUMENTS

| | | | | |
|---|---|---|---|---|
| 5,892,899 A * | 4/1999 | Aucsmith et al. | ............... | 726/27 |
| 6,088,452 A * | 7/2000 | Johnson et al. | ............... | 380/28 |
| 6,668,325 B1 * | 12/2003 | Collberg et al. | ............... | 713/194 |
| 7,007,025 B1 * | 2/2006 | Nason et al. | ............... | 1/1 |
| 7,080,257 B1 * | 7/2006 | Jakubowski et al. | ......... | 713/187 |
| 7,254,586 B2 * | 8/2007 | Chen et al. | ............... | 713/190 |
| 7,277,541 B1 * | 10/2007 | Jakubowski et al. | ......... | 380/37 |
| 7,287,166 B1 * | 10/2007 | Chang et al. | ............... | 713/187 |
| 7,340,734 B1 * | 3/2008 | de Waal | ............... | 717/159 |
| 7,430,670 B1 * | 9/2008 | Horning et al. | ............... | 713/190 |
| 7,447,912 B2 * | 11/2008 | Jakubowski et al. | ......... | 713/187 |
| 7,620,987 B2 * | 11/2009 | Shelest et al. | ............... | 726/22 |
| 7,640,583 B1 * | 12/2009 | Marinescu et al. | ............... | 726/22 |
| 7,644,440 B2 * | 1/2010 | Sinha et al. | ............... | 726/23 |
| 7,757,097 B2 * | 7/2010 | Atallah et al. | ............... | 713/187 |
| 7,770,016 B2 * | 8/2010 | Horne et al. | ............... | 713/176 |

(Continued)

FOREIGN PATENT DOCUMENTS

WO  2008/074382  6/2008

OTHER PUBLICATIONS

Majumdar, Anirban; Thomborson, Clark; Drape, Stephen; Bagchi, Aditya "A Survey of Control-Flow Obfuscations" in Information Systems Security Lecture Notes in Computer Science 2006 Springer Berline / Heidelberg. p. 353-356 vol. 4332 available at <http://dx.doi.org/10.1007/11961635_26>.*

(Continued)

*Primary Examiner* — Wei Zhen
*Assistant Examiner* — Matthew Brophy
(74) *Attorney, Agent, or Firm* — Novak Druce Connolly Bove + Quigg LLP

(57) ABSTRACT

Disclosed herein are systems, methods, and computer readable-media for obfuscating code through conditional expansion obfuscation. The method includes identifying a conditional expression in a computer program, identifying a sequence of conditional expressions that is semantically equivalent to the conditional expression, and replacing the conditional expression with the semantically equivalent sequence of conditional expressions. One option replaces each like conditional expression in the computer program with a diverse set of sequences of semantically equivalent conditional expressions. A second option rearranges computer instructions that are to be processed after the sequence of conditional expression is evaluated so that a portion of the instructions is performed before the entire sequence of conditional expressions is evaluated. A third option performs conditional expansion obfuscation of a conditional statement in combination with branch extraction obfuscation.

17 Claims, 6 Drawing Sheets

U.S. PATENT DOCUMENTS

| | | | |
|---|---|---|---|
| 7,779,270 B2* | 8/2010 | Horning et al. | 713/187 |
| 7,779,394 B2* | 8/2010 | Horning et al. | 717/136 |
| 7,823,135 B2* | 10/2010 | Horning et al. | 717/127 |
| 7,844,958 B2* | 11/2010 | Colton et al. | 717/146 |
| 8,001,607 B2* | 8/2011 | Stull et al. | 726/26 |
| 8,161,463 B2* | 4/2012 | Johnson et al. | 717/136 |
| 8,176,473 B2* | 5/2012 | Jacob et al. | 717/120 |
| 8,185,749 B2* | 5/2012 | Ciet et al. | 713/190 |
| 2003/0221121 A1* | 11/2003 | Chow et al. | 713/200 |
| 2004/0003264 A1* | 1/2004 | Zeman et al. | 713/190 |
| 2004/0154004 A1 | 8/2004 | Maine | |
| 2005/0155024 A1* | 7/2005 | Wannamaker et al. | 717/151 |
| 2005/0183072 A1* | 8/2005 | Horning et al. | 717/140 |
| 2005/0204348 A1* | 9/2005 | Horning et al. | 717/140 |
| 2005/0210275 A1* | 9/2005 | Horning et al. | 713/190 |
| 2005/0262490 A1* | 11/2005 | Thomborson et al. | 717/145 |
| 2007/0039048 A1* | 2/2007 | Shelest et al. | 726/22 |
| 2007/0234070 A1* | 10/2007 | Horning et al. | 713/190 |
| 2007/0256061 A1 | 11/2007 | Victorov | |
| 2008/0028474 A1* | 1/2008 | Horne et al. | 726/27 |
| 2008/0275829 A1* | 11/2008 | Stull et al. | 706/17 |
| 2008/0288902 A1 | 11/2008 | Nishide et al. | |
| 2009/0296922 A1* | 12/2009 | Smeets et al. | 380/28 |
| 2009/0319804 A1* | 12/2009 | Qi et al. | 713/190 |
| 2010/0058477 A1* | 3/2010 | Ciet et al. | 726/26 |
| 2010/0083240 A1* | 4/2010 | Siman | 717/144 |
| 2010/0199354 A1* | 8/2010 | Eker et al. | 726/26 |
| 2010/0251378 A1* | 9/2010 | Eker et al. | 726/26 |
| 2011/0214188 A1* | 9/2011 | Collberg et al. | 726/26 |

OTHER PUBLICATIONS

Ginger Myles and Christian Collberg. 2006. Software watermarking via opaque predicates: Implementation, analysis, and attacks. 6, 2 (Apr. 2006), 155-171. DOI=10.1007/s10660-006-6955-z http://dx.doi.org/10.1007/s10660-006-6955-z.*

* cited by examiner

FIG. 5A

```
if(a==b){
    x = 5 * a;
    y = x / 4;
    z = x + y;
}else{
    z = 0;
}
```

FIG. 5B

```
if(a>=b){
    x = 5 * a;
    if(a <= b){
        y = x / 4;
        z = x + y;
    }else{
        z = 0;
    }
}else{
    z = 0;
}
```

SYSTEM AND METHOD FOR CONDITIONAL EXPANSION OBFUSCATION

CROSS-REFERENCE TO RELATED APPLICATIONS

This application relates to U.S. patent application Ser. No. 12/203,101, titled "System and Method for Modulus Obfuscation", U.S. patent application Ser. No. 12/198,873, titled "System and Method for Branch Extraction Obfuscation", and U.S. patent application Ser. No. 12/135,032, titled "System and Method for Array Obfuscation". The contents of each are herein incorporated by reference.

BACKGROUND OF THE INVENTION

1. Field of the Invention

The present invention relates to software obfuscation and more specifically to obfuscating and expanding conditional segments of software.

2. Introduction

Computer software is first written as source code which is readable by a person trained to understand programming languages. Generally that source code is then compiled to object code that contains a list of instructions controlling what a computer does. Unfortunately for commercial software vendors who wish to enforce licensing or Digital Rights Management (DRM) provisions, malicious or mischievous individuals with enough time and resources can reverse engineer critical portions of the object code. Reverse engineering allows for discovery of how a program operates. One technique to reverse engineer object code is to load the executable into memory and examine the memory contents with a piece of software called a debugger to locate the critical portions of software enforcing the restrictions. Once the appropriate portions of object code are located and reverse engineered, the software may be modified to perform in a manner not anticipated by the software vendor, potentially bypassing DRM or licensing restrictions, but also potentially causing great harm or injury. For example, a malicious reverse engineer could alter legitimate code to include a virus or could alter operating software for dangerous machinery to disregard safety protocols.

DRM and software protection schemes in general work by means of security through obscurity, security by design, encryption, and other methods. Even a blend of these approaches is often insufficient to keep out a determined "hacker" or "cracker". While it is impossible to design a software protection scheme that is invulnerable to reverse engineering, the goal is not to create an impenetrable barrier. The goal is to raise the cost of reverse engineering so high that the perceived cost of reverse engineering outweighs the expected benefit. Accordingly, what is needed in the art is an improved way to store and execute software in a computer while making the software difficult to reverse engineer.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for conditional expansion obfuscation. The method includes identifying a conditional expression in a computer program, identifying a sequence of conditional expressions that is semantically equivalent to the conditional expression, and replacing the conditional expression with the semantically equivalent sequence of conditional expressions. One option replaces each like conditional expression in the computer program with a diverse set of sequences of semantically equivalent conditional expressions. A second option rearranges computer instructions that are to be processed after the sequence of conditional expression is evaluated so that a portion of the instructions is performed before the entire sequence of conditional expressions is evaluated. A third option performs conditional expansion obfuscation of a conditional statement in combination with branch extraction obfuscation.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 5A illustrates a sample code snippet;

FIG. 5B illustrates a transformed sample code snippet; and

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
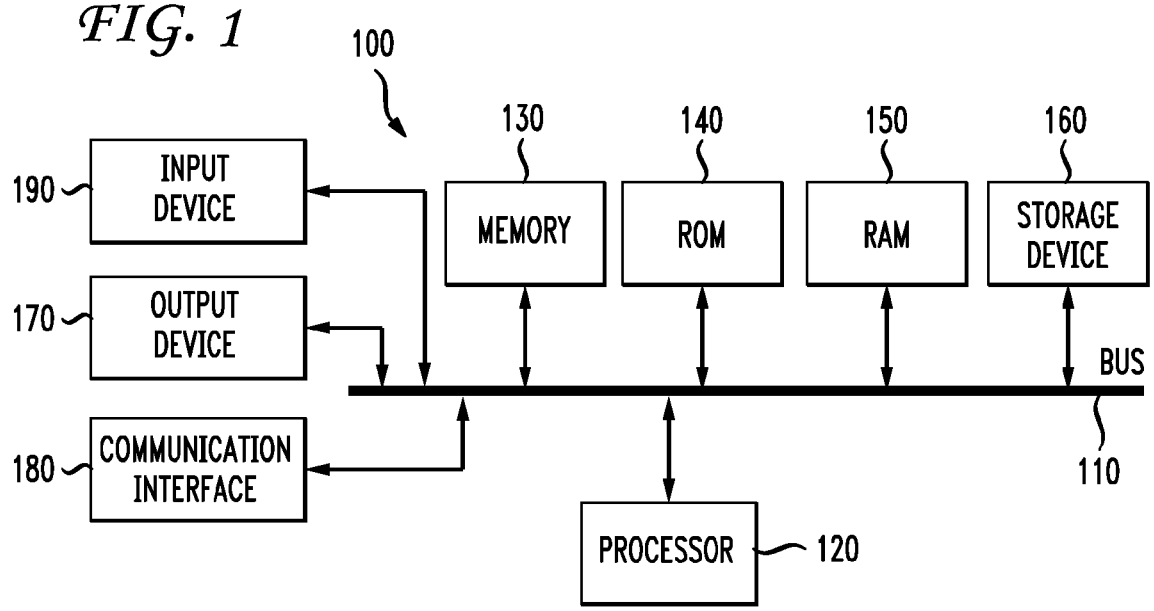
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software.

Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Obfuscation in the software realm is a process of making software or data confusing and difficult to understand, reverse engineer, disassemble, and/or decompile while maintaining the original, intended functionality. Obfuscation can be performed at a source code level to make understanding the source difficult or it can be performed at an object code or machine language level to make reverse engineering difficult. Both could be used in conjunction, but using one or the other is typically sufficient. At the object code or machine language level, obfuscation is often desirable to improve the resistance of compiled software, or binary, to static analysis. The general idea behind any obfuscation technique is to increase the amount of time, effort, and/or resources required to reverse engineer the binary that it is less costly to simply purchase or license the software or, alternatively, recreate it from scratch without using information from the protected program. Additionally, strong obfuscation techniques will force reverse engineering attempts away from static analysis and towards dynamic analysis, which is more difficult. Often source code is kept a secret from the public in a non-obfuscated form while publicly available binaries are distributed in obfuscated form. One goal of such a parallel obfuscated/non-obfuscated software distribution scheme is to achieve the advantages of obfuscation and keep the software maintainable.

Figure 2:
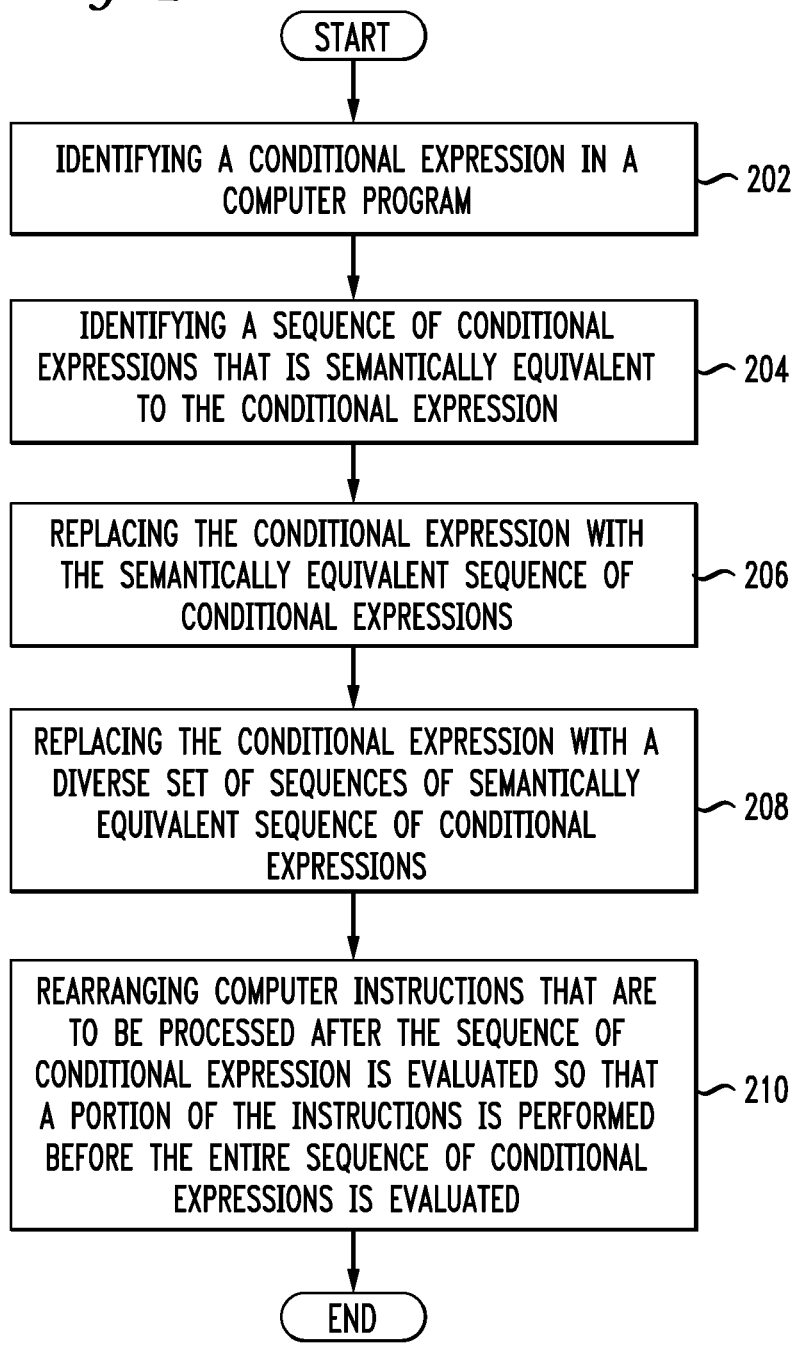
FIG. 2 illustrates an example method embodiment.

Keeping these fundamental principles in mind, the disclosure turns to an exemplary method embodiment as illustrated in FIG. 2. The method includes identifying a conditional expression in a computer program (202). IF . . . THEN is the classic conditional expression or conditional statement. IF . . . THEN . . . ELSE and IF . . . THEN . . . ELSE IF are common variations. Conditional statements also include SWITCH statements which are effectively a series of individual IF . . . THEN statements. C-style FOR loops contain conditionals as a component as well as almost any other loops, such as DO . . . WHILE, WHILE, REPEAT . . . UNTIL, etc. Conditional statements can be nested within other conditional statements. Any of these conditional statements are anticipated as well as those yet to be developed. The syntax of the conditional statement in a given language does not affect the applicability of the conditional expansion obfuscation technique; conditional expansion can be accomplished with virtually any programming language.

The method includes identifying a sequence of conditional expressions that is semantically equivalent to the conditional expression (204). One simple example is the conditional expression (a==b), or in other words, is a equal to b. One semantically equivalent sequence of conditional expressions is ((a>=b) && (a<=b)), or in other words, is a greater than or equal to b and is a less than or equal to b. Truth tables can be used to verify that one conditional expression is equivalent to a sequence of conditional expressions. Truth tables are a chart or a table that lays out each combination of each possible value for each input and the corresponding output or result of each combination. If the truth table for the conditional expression and the sequence of conditional expressions are the same, they are equivalent.

The method further includes replacing the conditional expression with the semantically equivalent sequence of conditional expressions (206), thereby expanding the conditional statement. A compiler can perform this replacement during compile time. A separate module can perform this replacement on source code prior to compile time. A post-compiler module can performed this replacement on a binary or object code. A compiler can repeat these steps on subsets of the expanded conditional expression until a desired level of complexity is reached. A user or developer can establish a threshold indicating the desired level of complexity. As the length of the equivalent sequence of conditional expressions increases, reverse engineering is made more difficult.

This is the most basic and fundamental method of conditional expansion obfuscation. Three variations are described herein which are optional, but which can be used in any combination to further enhance obfuscation. The first variation incorporates diversity in the conditional expression sequences. The second variation rearranges instructions that are processed after the conditional expression is evaluated. The third variation combines conditional expansion obfuscation with branch extraction obfuscation. All or part of the example method and its variations can be incorporated into a compiler.

In the first variation, the method further optionally replaces the conditional expression with a diverse set of sequences of semantically equivalent sequence of conditional expressions (208). If the same sequences of conditional expressions are used over and over again, a reverse engineer could simply reduce each sequence down to its simplest equivalent expression and essentially search and replace known sequences with their reduced equivalent. In order to reduce the effectiveness of such an approach, a diverse set of sequences of semantically equivalent conditional expressions can be generated randomly. Randomly generated sequences can be combined with sequences generated by hand. A diverse set of sequences of semantically equivalent conditional expressions can be stored in and retrieved from a library of sequences of conditional expressions. Such a library can be updated by removing, altering, and adding sequences of conditional expressions. In this way, even if reverse engineers compromise one particular version of an application, subsequent versions would include different sequences from an updated library and would not be vulnerable to the same attack. The random approach and the library approach can be combined by randomly selecting one sequence from a category of equivalent sequences in the library.

In the second variation, the method further optionally rearranges computer instructions that are to be processed after the sequence of conditional expression is evaluated so that a portion of the instructions is performed before the entire sequence of conditional expressions is evaluated (210). One example of this variation is shown in more detail in FIG. 5A and FIG. 5B below.

In the third variation, conditional expansion obfuscation is combined with branch extraction obfuscation. They can be combined in any order or combination. Combining conditional expansion and branch extraction in different order can result in very different code. The order, type, and amount of obfuscation applied can vary based on many application-specific factors such as the need for obfuscation, performance, execution time, storage space, etc.

Figure 3:
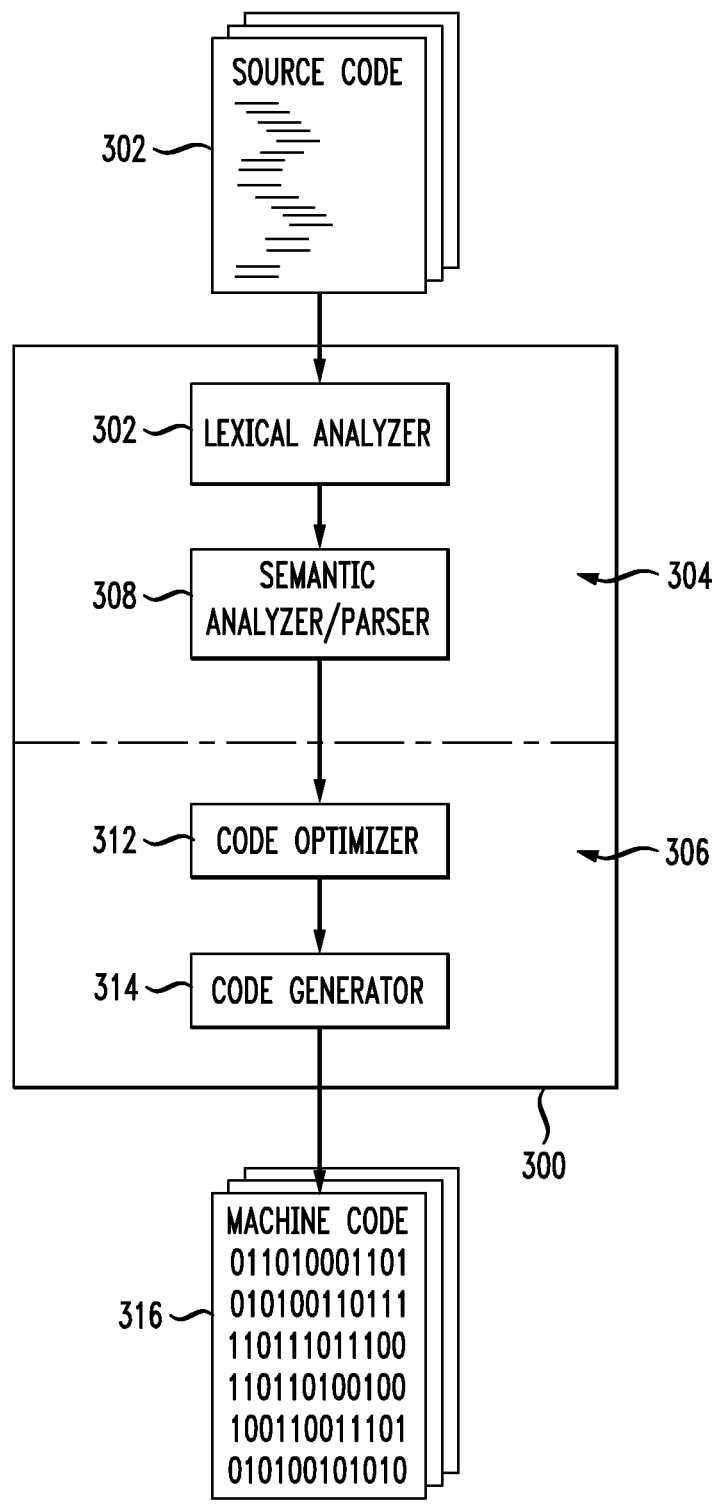
FIG. 3 illustrates a basic, nonobfuscating compiler.

FIG. 3 illustrates a basic, nonobfuscating compiler which is known in the art. A compiler converts human readable source code to object code which is understandable and typically executable by a computer. A compiler is likely to perform many or all of the following operations: lexical analysis, preprocessing, parsing, semantic analysis, code optimization, and code generation. Compilers are important in the world of computer science and software because they allow programmers to express their ideas and write software using high level languages rather than binary, assembly, or other low-level languages.

The compiler 300 takes as input source code 302 for a computer program written in a programming language like Perl, C++, Java, etc. Although a compiler is depicted, the same principles can be applied to an interpreted language, although other obfuscation and/or security measures may be needed when working with an interpreted language. Next, the code is passed to the front end of the compiler 304 and then to the back end of the compiler 306. Often the division between a front end and a back end of a compiler is somewhat blurred. Traditionally the front end of a compiler includes a lexical analysis module 308 and a semantic analyzer or parser module 310. Other front end components include a preprocessing module and a semantic analysis module. The front end produces an intermediate representation of the code which is passed to the back end 306 of the compiler 300. The back end 306 of a compiler 300 includes modules like an optimizer 312 and a code generator 314. The code generator 314 in the back end of the compiler produces machine code 316 or object code. The output from several compiled projects can be fed into a linker to combine related object code into a single executable file.

Figure 4:
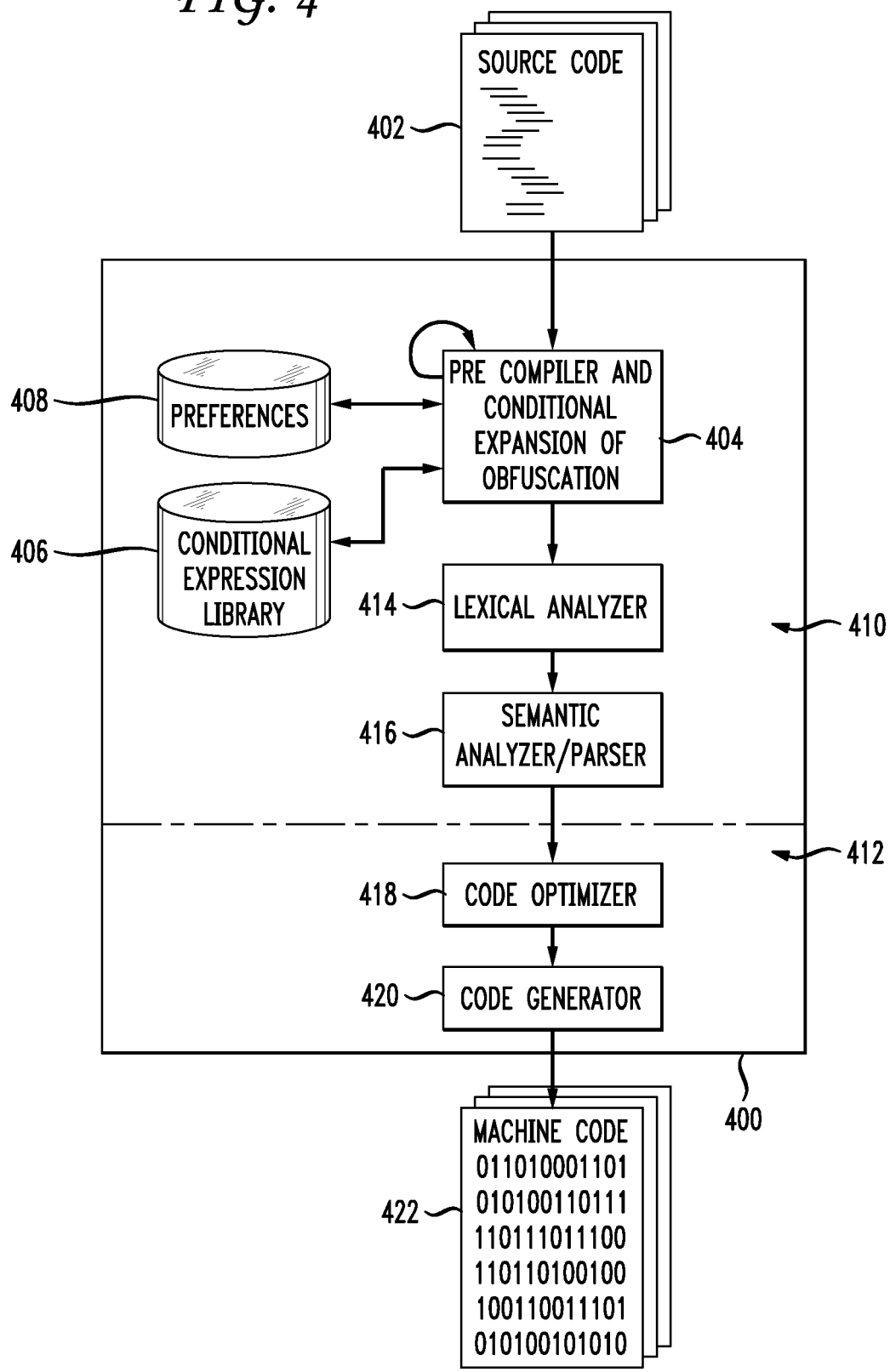
FIG. 4 illustrates a sample obfuscating compiler that incorporates diverse conditional expressions.

FIG. 4 illustrates a sample obfuscating compiler that incorporates diverse conditional expressions. The compiler 400 takes as input source code 402 for a computer program written in a programming language like Perl, C++, Java, etc. Although a compiler is depicted, the same principles can be applied to an interpreted language, although other obfuscation and/or security measures may be needed when working with an interpreted language. The source code 402 is processed by a precompiler and conditional expansion obfuscator 404. The precompiler analyzes source code to identify conditional expressions to expand. The precompiler can be applied to the entire body of source code or particular subroutines. A programmer can insert a command in the source code designating which conditional expressions are to be expanded. When conditional expressions are found, the precompiler selects and retrieves an equivalent sequence of conditional expressions from a conditional expression library 406. The conditional expression library can contain a diverse set of conditional expressions and sequences of conditional expressions as well as their respective simplified equivalents. A database of preferences 408 can guide the type and amount of conditional expansion sequences to be inserted. For example, preferences can state that only random sequences of conditional expressions should be used or require a minimum sequence length. Preferences can govern at an application level, a developer level, a function level, etc. The compiler 400 can apply and reapply the precompiler 404 as many times as necessary to achieve a desired level of complexity in the source code.

Transformed source code including expanded sequences of conditional expressions is then passed to the front end of the compiler 410 and then to the back end of the compiler 412. Often the division between a front end and a back end of a compiler is somewhat blurred. Traditionally the front end of a compiler includes a lexical analysis module 414 and a semantic analyzer or parser module 416. Other front end components include a preprocessing module and a semantic analysis module. The front end produces an intermediate representation of the code which is passed to the back end 412 of the compiler 400. The back end 412 of a compiler 400 includes modules like an optimizer 418 and a code generator 420. In some cases, an overly aggressive optimizer can factor out obfuscations, and decrease the effectiveness of the conditional expansion obfuscation. If this is the case, the optimizer should be instructed to avoid such overly aggressive optimizations. The code generator 420 in the back end of the compiler produces machine code 422 or object code. The output from several compiled projects can be fed into a linker to combine related object code into a single executable file.

FIGS. 5A and 5B illustrate the second variation which involves rearranging instructions that are processed after the conditional expression is evaluated. FIG. 5A illustrates a sample code snippet that is not obfuscated. Three lines of code are executed after the conditional statement "if (a==b)" and one line of code is executed in the alternative. The code here is purely demonstrative and does not accomplish any particular real-life goal beyond demonstration purposes.

FIG. 5B illustrates a transformed sample code snippet. The conditional statement has been expanded and replaced with two conditional statements, "if (a>=b)" and "if (a<=b)". This sequence of two conditional statements can be combined to form the equivalent sequence "if ((a>=b) && (a<=b))". FIG. 5B illustrates that, in some cases, the instructions can be arranged so that some portion are executed before the entire sequence of conditional statements is completely evaluated. In this example, one of the instructions is executed after the first if statement and the remaining instructions are executed after the second nested if statement. In this way, reverse engineering attempts are forced away from static analysis toward dynamic analysis.

Figure 6:
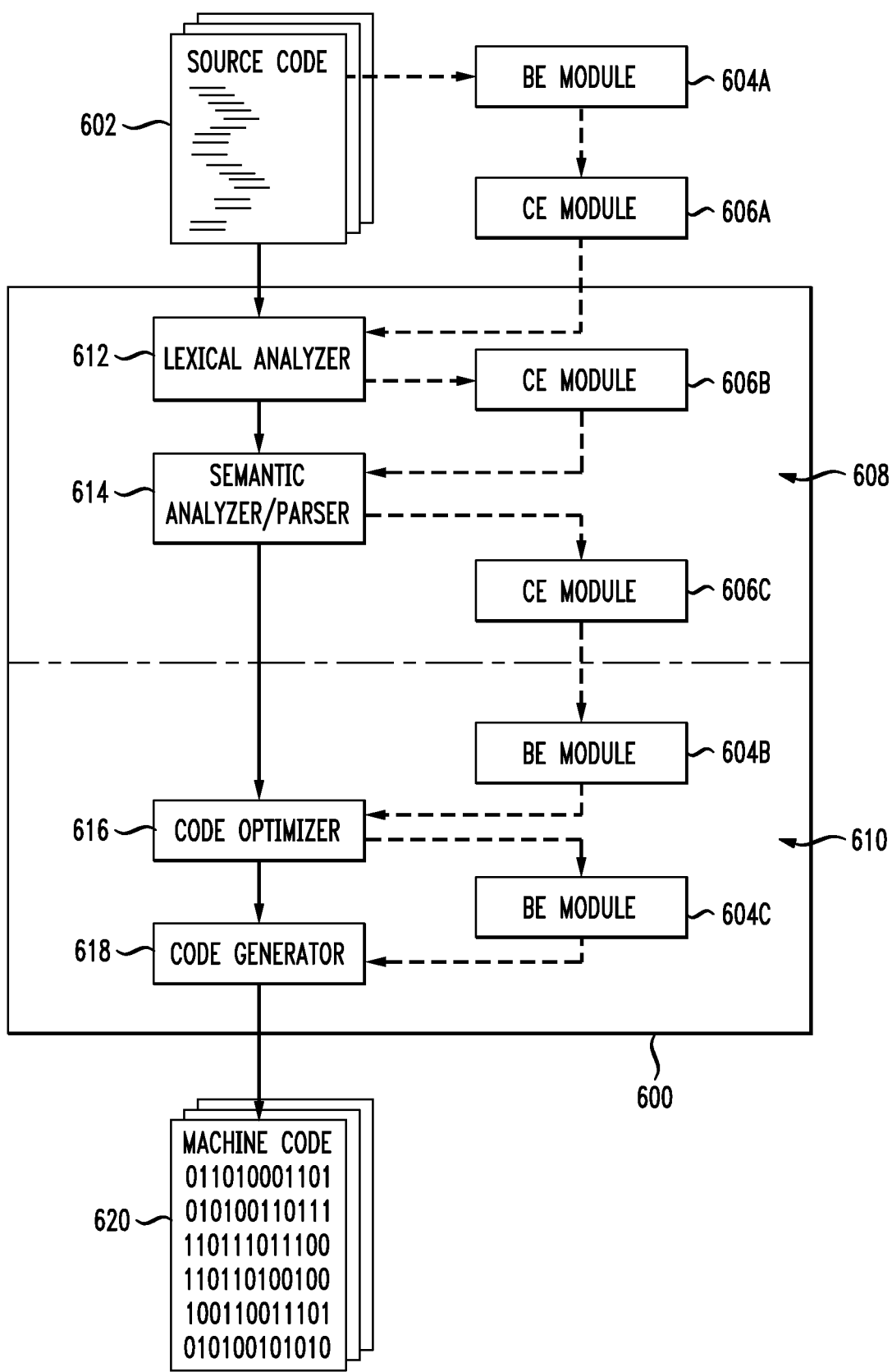
FIG. 6 illustrates a sample obfuscating compiler that combines conditional expansion obfuscation with branch extraction obfuscation.

FIG. 6 illustrates the third variation by means of a sample obfuscating compiler that combines conditional expansion obfuscation with branch extraction obfuscation. It is important to note that even though conditional expansion obfuscation can be combined with other obfuscation techniques, conditional expansion is a complete obfuscation in and of itself that does not need to be combined. Conditional expansion and branch extraction can be performed in different orders, in different combinations, and at different stages to obtain different results. For example, applying branch extraction obfuscation before conditional expansion obfuscation can increase the complexity of the new functions created by the branch extraction obfuscation. In another example, once a conditional statement is expanded, branch extraction obfuscation can be used to extract one or more of the newly inserted conditional expressions from the original location and place them in a new function.

In yet another example, if the original conditional expression is replaced by a sequence of four conditional expressions, a branch extraction obfuscation module can extract two of the expressions and put both of them in the same new function. Alternatively, the branch extraction obfuscation module could be used to extract three of the four newly inserted conditional expressions and create a new function for each. The particular way the two obfuscation techniques are combined can be based on the desired balance of complexity, storage space, and time.

FIG. 6 illustrates a compiler that performs some of these combinations. First, the compiler 600 takes as input source code 602 for a computer program written in a programming language like Perl, C++, Java, etc. Although a compiler is depicted, the same principles can be applied to an interpreted language, although other obfuscation and/or security measures may be needed when working with an interpreted language. Before compile time, the source code can be passed through a branch extraction (BE) module 604A, then through a conditional expansion (CE) module 606A. Next, the code is passed to the front end of the compiler 608 and then to the back end of the compiler 610. Often the division between a front end and a back end of a compiler is somewhat blurred. Traditionally the front end of a compiler includes a lexical analysis module 612 and a semantic analyzer or parser module 614. The front end can optionally include various obfuscation modules. A CE module 606B is shown operating between the lexical analyzer 612 and the semantic analyzer/parser 614. The front end produces an intermediate representation of the code which is passed to the back end 610 of the compiler 600. A compiler can include obfuscation modules 604B, 606C which process the intermediate representation of the code before passing it to the back end. The back end 610 of a compiler 600 includes modules like an optimizer 616 and a code generator 618. Even at this late stage in the compiling process, obfuscation modules 604C can be included. The code generator 618 in the back end of the compiler produces machine code 620 or object code. Although not depicted, obfuscation modules can be applied to further obfuscate even the resulting machine code 620. The output from several compiled projects can be fed into a linker to combine related object code into a single executable file.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in any software, system, and/or device intended to be difficult to reverse-engineer. Those skilled in the art will readily recognize various modifications and changes that may be made to the present invention without following the example embodiments and applications illustrated and described herein, and without departing from the true spirit and scope of the present invention.

We claim:

1. A method of obfuscating code, the method comprising:
   identifying a first boolean statement in a first conditional expression in a computer program, wherein in response to a one or more input values the first boolean statement evaluates to a corresponding first boolean value wherein a first set of instructions is executed only when the first conditional expression evaluates to a first value based at least in part on the first boolean value;
   identifying preferences for determining a level of obfuscation to be applied to the system
   selecting from a conditional expression library, based on said preferences, a first sequence of two or more boolean statements that is semantically equivalent to the first boolean statement, wherein the sequence of two or more boolean statements when executed together evaluate to the corresponding first boolean value in response to the one or more input values, and further wherein each boolean statement in the first sequence of two or more boolean statements differs from the first boolean statement;
   replacing the first boolean statement with the semantically equivalent first sequence of two or more boolean statements;
   selecting a first subset of the first set of instructions comprising less than all of the first set of instructions; and
   reordering the instructions such that the first subset of the first set of instructions to execute before completing execution of the first sequence of two or more boolean statements and remaining instructions in the first set of instructions execute after completing execution of the first sequence of two or more boolean statements.

2. The method of claim 1, wherein conditional expansion obfuscation of a boolean statement is performed in combination with branch extraction obfuscation.

3. A system for obfuscating code, the system comprising:
   a processor;
   a computer readable storage medium storing instructions for controlling the processor to perform steps comprising:
   identifying a first boolean statement in a first conditional expression in a computer program, wherein in response to a one or more input values the first boolean statement evaluates to a corresponding first boolean value, wherein a first set of instructions is executed only when the first conditional expression evaluates to a first value based at least in part on the first boolean value;
   identifying preferences for determining a level of obfuscation to be applied to the system;
   selecting from a conditional expression library, based on said preferences, a first sequence of two or more boolean statements that is semantically equivalent to the first boolean statement, wherein the first sequence of two or more boolean statements when executed together evaluate to the corresponding first boolean value in response to the one or more input values, and further wherein each boolean statement in the first sequence of two or more boolean statements differs from the first boolean statement;
   replacing the first boolean statement with the semantically equivalent first sequence of two or more boolean statements;
   selecting a first subset of the first set of instructions comprising less than all of the first set of instructions; and
   reordering the instructions such that the first subset of the first set of instructions to execute before completing execution of the first sequence of two or more boolean statements and remaining instructions in the first set of instructions execute after completing execution of the first sequence of two or more boolean statements.

4. The system of claim 3, wherein conditional expansion obfuscation of a boolean statement is performed in combination with branch extraction obfuscation.

5. A non-transitory computer-readable medium storing a computer program having instructions for obfuscating code, the instructions comprising:
   identifying a first boolean statement in a first conditional expression in a computer program, wherein in response to a one or more input values the first boolean expression evaluates to a corresponding first boolean value, wherein a first set of instructions is executed only when the first conditional expression evaluates to a first value based at least in part on the first boolean value;
   identifying preferences for determining a level of obfuscation to be applied to the system;
   selecting from a conditional expression library, based on said preferences, a first sequence of two or more boolean statements that is semantically equivalent to the first boolean statement, wherein the first sequence of two or more boolean statements when executed together evaluate to the corresponding first boolean value in response to the one or more input values, and further wherein each boolean statement in the first sequence of two or more boolean statements differs from the first boolean statement;
   replacing the first boolean statement with the semantically equivalent first sequence of two or more boolean statements;
   selecting a first subset of the first set of instructions comprising less than all of the first set of instructions; and
   reordering the instructions such that the first subset of the first set of instructions to execute before completing execution of the first sequence of two or more boolean statements and remaining instructions in the first set of instructions execute after completing execution of the first sequence of two or more boolean statements.

6. The method of claim 1, further comprising:
identifying a second boolean statement in a second conditional expression in the computer program, the second boolean statement being equivalent to the first boolean statement;
identifying a second sequence of two or more boolean statements that is semantically equivalent to the second boolean statement, the second sequence of two or more boolean statements including at least one boolean statement unique from the two more boolean statements in the first sequence of boolean statements.

7. The method of claim 1, wherein identifying the first sequence of two or more boolean statements includes selecting the first sequence of two or more boolean statements from a library of semantically equivalent sequences of boolean statements.

8. The method of claim 7, wherein the first sequence of two or more boolean statements is selected randomly from the library.

9. The method of claim 7, wherein the first sequence of two or more boolean statements is selected based on at least one of minimum sequence length or desired level of complexity.

10. The system of claim 3, further comprising:
identifying a second boolean statement in a second conditional expression in the computer program, the second boolean statement being equivalent to the first boolean statement;
identifying a second sequence of two or more boolean statements that is semantically equivalent to the second boolean statement, the second sequence of two or more boolean statements including at least one boolean statement unique from the two more boolean statements in the first sequence of boolean statements.

11. The system of claim 3, wherein identifying the first sequence of two or more boolean statements includes selecting the first sequence of two or more boolean statements from a library of semantically equivalent sequences of boolean statements.

12. The system of claim 11, wherein the first sequence of two or more boolean statements is selected randomly from the library.

13. The system of claim 11, wherein the first sequence of two or more boolean statements is selected based on at least one of minimum sequence length or desired level of complexity.

14. The non-transitory computer-readable medium of claim 5, further comprising: identifying a second boolean statement in a second conditional expression in the computer program, the second boolean statement being equivalent to the first boolean statement;
identifying a second sequence of two or more boolean statements that is semantically equivalent to the second boolean statement, the second sequence of two or more boolean statements including at least one boolean statement unique from the two more boolean statements in the first sequence of boolean statements.

15. The non-transitory computer-readable medium of claim 5, wherein identifying the first sequence of two or more boolean statements includes selecting the first sequence of two or more boolean statements from a library of semantically equivalent sequences of boolean statements.

16. The non-transitory computer-readable medium of claim 15, wherein the first sequence of two or more boolean statements is selected randomly from the library.

17. The non-transitory computer-readable medium of claim 15, wherein the first sequence of two or more boolean statements is selected based on at least one of minimum sequence length or desired level of complexity.

* * * * *

UNITED STATES PATENT AND TRADEMARK OFFICE
CERTIFICATE OF CORRECTION

PATENT NO. : 8,429,637 B2  
APPLICATION NO. : 12/202909  
DATED : April 23, 2013  
INVENTOR(S) : Gideon M. Myles et al.

Page 1 of 1

It is certified that error appears in the above-identified patent and that said Letters Patent is hereby corrected as shown below:

In the Claims

Claim 1, Column 9, line 44, please change "the system" to --the system;--.

Claim 6, Column 11, line 9, please change "statement;" to --statement; and--.

Claim 10, Column 11, line 31, please change "statement;" to --statement; and--.

Claim 14, Column 12, line 17, please change "statement;" to --statement; and--.

Signed and Sealed this  
Third Day of September, 2013

Teresa Stanek Rea  
*Acting Director of the United States Patent and Trademark Office*